Figure 1:
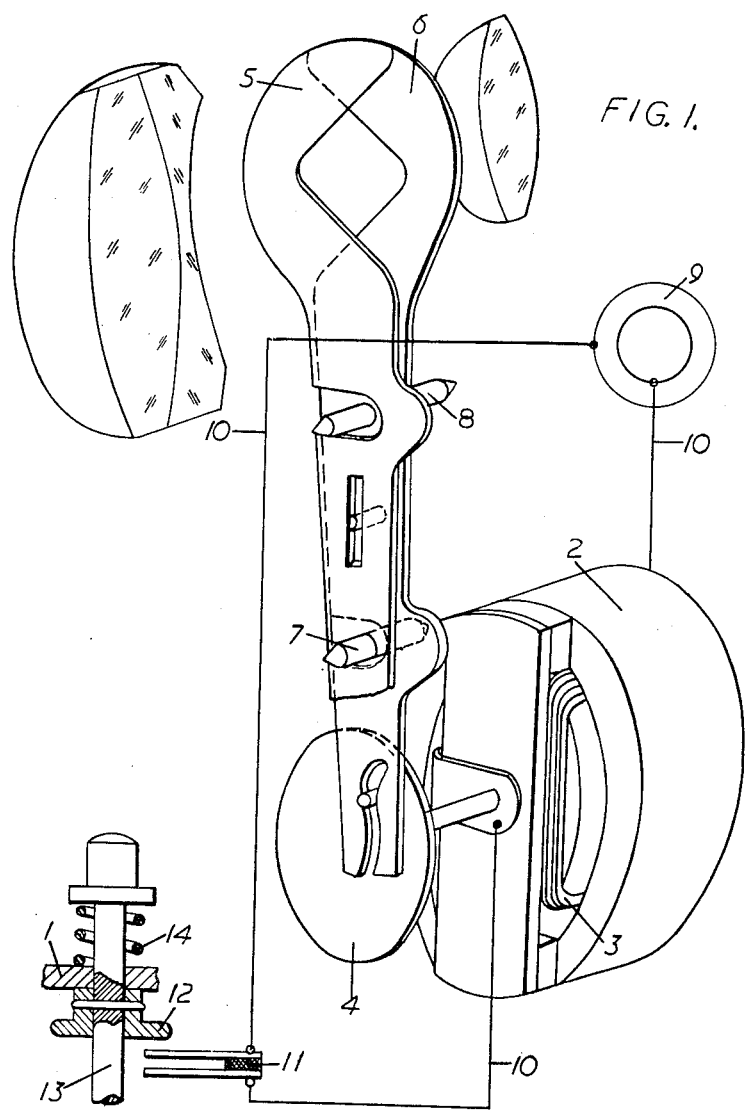

Inventor
HEINZ SCHULZE

Aug. 21, 1962 H. SCHULZE 3,049,983
MIRROR REFLEX CAMERA WITH EXPOSURE METER
Filed April 1, 1960 2 Sheets-Sheet 2
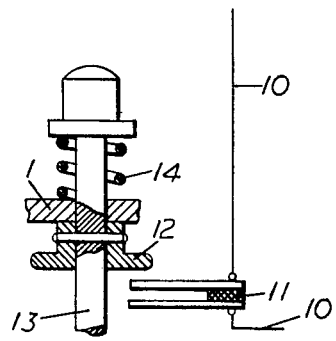
FIG. 2.
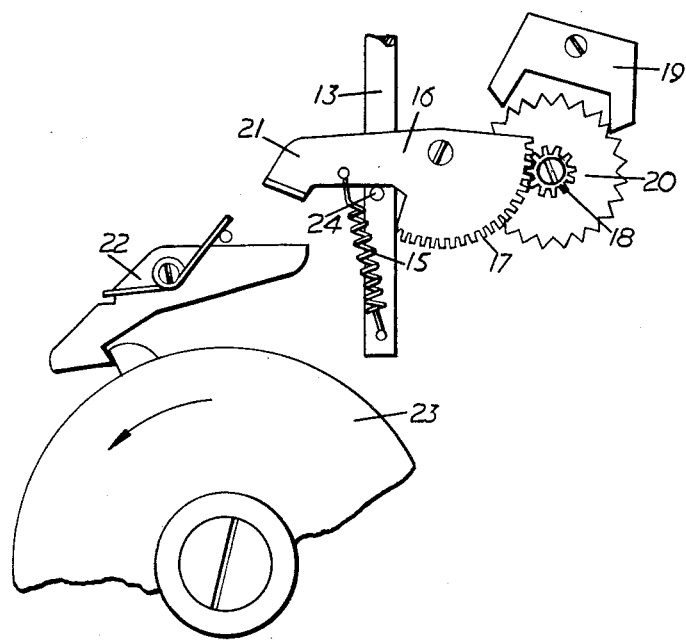
Inventor
HEINZ SCHULZE
By Irwin S. Thompson
Attorney United States Patent Office 3,049,983
Patented Aug. 21, 1962

3,049,983
MIRROR REFLEX CAMERA WITH
EXPOSURE METER
Heinz Schulze, Dresden, Germany, assignor to VEB
Kamera- und Kinowerke Dresden, Dresden, Germany
Filed Apr. 1, 1960, Ser. No. 19,322
3 Claims. (Cl. 95—64)

The present invention relates to a cinematic or photographic mirror reflex camera with exposure meter, the moving coil of which is coupled with a lens diaphragm.

For the purpose of viewing the object the lens diaphragm should be opened as fully as possible before the taking of the photograph. The fully automatic control arrangements which have become known hitherto for use in monocular mirror reflex cameras were disadvantageous inasmuch as special handles had to be provided for the opening of the diaphragm, which took place independently of the moving coil movement.

The task of this invention is the avoidance of such additional handles by the provision of a novel opening arrangement for lens diaphragms.

In accordance with the invention this is achieved due to the fact that in the control current circuit, parallel or in series with the moving coil, there is arranged a switch which is opened or closed on actuation of the camera release. In order to render it possible, before the commencement of the exposure operation, for the diaphragm to set itself to the value corresponding to the existing brightness, the release preferably releases the running mechanism which drives the shutter mechanism, through an escapement. In order to avoid a separate cocking of the escapement before every photograph, the drive spring of the escapement is expediently cocked at the same time in the actuation of the camera release. The details of the invention may be seen from the example of embodiment as described and represented hereinafter.

FIGURE 1 shows the lens diaphragm; and
FIGURE 2 the release arrangement.

In a housing 1, not specially illustrated, there is arranged the core-magnet measuring mechanism 2, the moving coil 3 of which is coupled through the control disc 4 with the contrarily movable diaphragm blades 5 and 6. The diaphragm blades 5 and 6 are rotatably mounted in the housing by means of the journals 7 and 8. The photo-electric cell 9 is connected through the leads 10 with the moving coil 3, in series with which there is connected the switch 11. The switch 11 is arranged in the path of the sleeve 12, which is mounted on the release push-rod 13. The spring 14 seeks to hold the release push-rod 13 in the inoperative position. To the push-rod 13 there is further secured one end of the spring 15, while the other end of the spring 15 is held by the toothed segment 16. The toothing 17 of the toothed segment 16 meshes with a pinion 18, which is firmly connected with the escape wheel 20 rotating before the lever 19. In the path of the arm 21 there lies the catch lever 22, which holds the shutter driving device 23 against a drive spring acting in the direction of the arrow.

The manner of operation of the arrangement is as follows:

In the rest position the release push-rod 13 is held out of engagement with the switch 11 by the spring 14. The spring 15 is untensioned, and the pin 24 has returned the toothed segment 16 into its initial position.

As a result of the current circuit 10 opened by the switch 11 the return spring (not shown) of the moving coil 3 moves the diaphragm blades 5 and 6 into the position of maximum diaphragm aperture, so that observation of the object to be photographed can take place. Only on re-pressing of the push-rod 13 is the switch 11 closed, so that the moving coil 3 can set the diaphragm blades 5 and 6 according to the existing brightness. At the same time, the spring 15 is tensioned, which drives the toothed segment 16 delaying through the escape wheel 20 and the lever 19, and strikes with the arm 21 against the catch lever 22. Consequently, the catch lever 22 is rotated in the clockwise direction and the shutter driving device 23 is released, so that the picture-taking takes place.

Apart from the present example of embodiment, the switch 11 can also be arranged in parallel with the moving coil 3. In this case, however, it would have to be ensured that the switch is closed when the camera is in the inoperative position and is opened on actuation of the release push-rod 13.

I claim:

1. In a reflex camera having a housing, a shutter mounted in the housing, including a shutter driving device operatively connected to said shutter and capable of moving from a cocked position to a rest position under the influence of a spring, releasable means for arresting the shutter driving device in its cocked position, an exposure meter circuit, including a moving coil and a photo-electric cell, and an aperture diaphragm coupled with the moving coil, the provision of a shutter release member mounted in the camera housing and movable between a rest position and a depressed position, a second spring for urging said release member into its rest position, a switch provided in the exposure meter circuit, said switch being operable by said release member immediately upon movement of the release member to its depressed position, a releasing member pivotally mounted in the housing and movable between a rest position and an operative position, said releasing member in its operative position co-acting with said releasable means to release said shutter driving device, a third spring for urging said releasing member from its rest position to its operative position, said releasing member in its rest position being arrested by the release member when the latter is in the rest position, and an escapement mechanism operatively connected to said releasing member to control the rate of movement of the releasing member from its rest position to its operative position.

2. A reflex camera according to claim 1, wherein the releasable means is in the form of a pivoted lever having an arm extending on each side of the pivot thereof, the first arm of which having a hooked portion which engages a projection provided on the shutter driving device to arrest the latter, the shutter release member is in the form of a push-rod having a first element which is engageable with the switch and a second element which is engageable with the releasing member to hold the latter against the force of its spring when the push-rod is in the rest position, and the releasing member is in the form of a further pivoted lever having an arm extending on one side of the pivot thereof engageable with the second arm of the releasable means and a toothed segment extending on the other side, said segment being in engagement with the escapement mechanism.

3. A reflex camera according to claim 1, wherein the switch is connected in the circuit in series with the photo-electric cell and the moving coil and is open when the release member is in the rest position.

References Cited in the file of this patent
UNITED STATES PATENTS 2,387,574   Gehmlich  ---------------- Oct. 23, 1945
2,412,424   Rath  -------------------- Dec. 10, 1946